United States Patent

[11] 3,615,692

[72] Inventor Kenneth O. Lovell
 St. Louis, Mo.
[21] Appl. No. 837,662
[22] Filed June 30, 1969
[45] Patented Oct. 26, 1971
[73] Assignee Ralston Purina Company
 St. Louis, Mo.

[54] METHOD OF PREPARING A STUFFED POULTRY LEG
 4 Claims, 4 Drawing Figs.
[52] U.S. Cl..................................................... 99/107,
 99/194
[51] Int. Cl.......................................................A22c 21/00,
 A23b 1/00
[50] Field of Search............................................ 99/107,
 194; 17/45, 46

[56] References Cited
UNITED STATES PATENTS

| | | | |
|---|---|---|---|
| 2,844,844 | 7/1958 | Sieczewicz.................. | 17/45 |
| 2,853,389 | 9/1958 | Luchese....................... | 99/107 |
| 3,031,310 | 4/1962 | Zolezzi et al.................. | 99/107 X |
| 3,078,172 | 2/1963 | Libby........................... | 99/107 X |

Primary Examiner—Hyman Lord
Attorneys—R. W. Brukardt and L. J. Hurst

ABSTRACT: A poultry product having a shape resembling the leg portion thereof is formed by removing the meat and skin from the femur and tibia portion of the leg in such a manner as to form a pocket in the tibia portion of the meat. The pocket may then be filled with a stuffing material and the meat portion which was around the femur bone folded over to form a stuffed poultry product resembling the leg thereof and which will retain the stuffing when subjected to cooking.

PATENTED OCT 26 1971 3,615,692

INVENTOR
KENNETH O. LOVELL
BY
Lawrence J. Hurst
ATTORNEY

1

METHOD OF PREPARING A STUFFED POULTRY LEG

BACKGROUND OF THE INVENTION

In the past, stuffed poultry products available on the market have consisted of deboned poultry pieces which have been wrapped around a stuffing material. In order to obtain the necessary poultry pieces, it was required that an incision be made in the meat along the entire length of the bones to enable the bones to be removed from the poultry pieces. It was difficult to handle and properly fold over the poultry meat to retain the stuffing material surrounded by the poultry meat. Further, such stuffed poultry products had the undesirable or disadvantageous feature of permitting the stuffing material to run or leak from the folded over poultry meat.

In order to eliminate the possibility of obtaining an unsightly poultry product due to the leaking of the stuffing therefrom when cooking, applicant has discovered a novel method of removing the femur and tibia bones from a poultry leg such that a natural pocket is formed suitable for retaining stuffing material therein, even when subjected to cooking.

It is, therefore, the general object of the present invention to provide a method of producing a stuffed poultry product having a natural pocket therein for retaining the stuffing material.

Another object of the present invention is to provide a method for removing the meat from a poultry leg in a simplified manner such that a natural pocket for ease of stuffing is obtained.

SUMMARY OF THE INVENTION

Briefly, the present invention comprises a poultry product and method of preparing same by the steps of peeling the meat down from the femur bone, making cuts around the kneecap to free the poultry meat from the cartilage thereabout, stripping the meat and skin down the tibia and over the nodule, whereby a pocket is formed in the meat, stuffing a material into the pocket, and thereafter folding the femur meat portion into a shape resembling a poultry leg.

BRIEF DESCRIPTION OF THE DRAWINGS

In the accompanying drawings, in which one of various possible embodiments of the invention is illustrated and wherein like numerals designate like parts.

DESCRIPTION OF THE PREFERRED EMBODIMENTS

Poultry, as used herein, may mean chicken, ducks, squab or other such birds, but for clarity the description may refer to chicken, although this is not intended to limit the invention to chicken.

Figure 1:
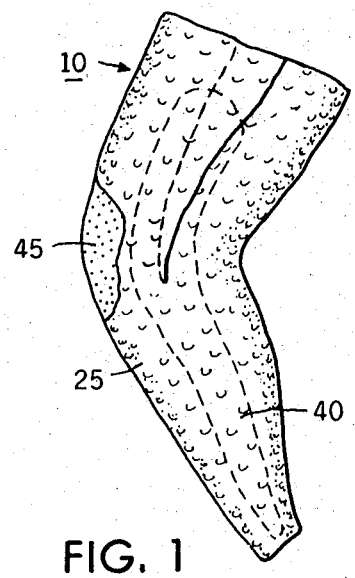
FIG. 1 illustrates the poultry product embodying the present invention.
Figure 2:
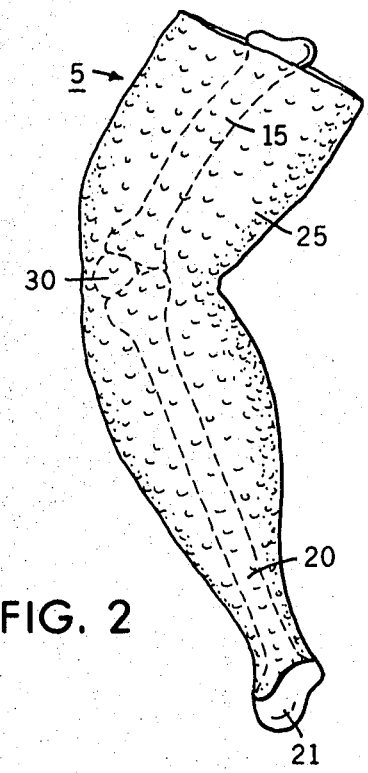
FIG. 2 is a view of a chicken leg having the femur and tibia bones therein.
Figure 3:
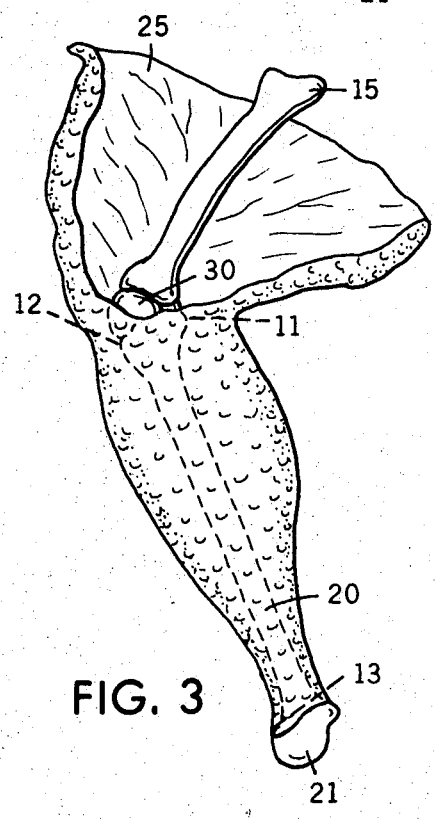
FIG. 3 is a view of the chicken leg having the femur bone free of meat and indicating the cuts to be made for further deboning.

The poultry product indicated generally at 10 is prepared from a poultry or chicken leg 5 which has previously been removed from the corpus of the bird during a standard deboning operation. The poultry or chicken leg 5 has a femur bone 15 which was popped or removed from the socket with the breast and thereafter the meat was severed to remove the meat and bone from the carcass of the bird. The tibia bone 20 is connected to the femur 15, with the metatarsus portion of the poultry or chicken leg having been previously removed. The femur meat and skin portion 25 of the leg is obtained by first pushing the femur bone through the meat tissue and skin of the inside of the leg. The meat tissue and skin are then stripped or peeled from the upper end of the femur bone to the knee joint 30, as illustrated in FIG. 3. The skin and meat in the femur area readily separates from the bone so that the removal of the meat and skin from this bone is relatively easy. The separation of meat and bone being a natural phenomena and not requiring special cuts to effect this operation. The femur meat portion should be peeled down the femur bone 15 as close to the knee joint 30 as possible.

Thereafter a cut should be made, as generally indicated by the dotted line 11, nearly perpendicular to the femur bone 15 from the inside of the leg to just below the joint 30. Several cuts should then be made about the knee joint 30 on about a 45° angle downward toward the tibia, as indicated generally by the dotted line 12. These cuts are made so as to free the skin and flesh portion 25 from the cartilage at the knee joint 30. The meat or flesh and skin 25 is then stripped or pulled from the tibia bone 20 and over the nodule 21 on the end thereof. The meat and skin 25 of the leg 5 are thus inverted when pulled from the tibia bone 20. The meat and skin 25 are cut free of the tibia bone 20 by making a cut along the line indicated generally at 13 which is perpendicular to the tibia. This serves to sever the tendons which normally secure the flesh or meat to the tibia bone. An integral piece of meat is then obtained from the femur and tibia portions of the poultry leg.

Figure 4:
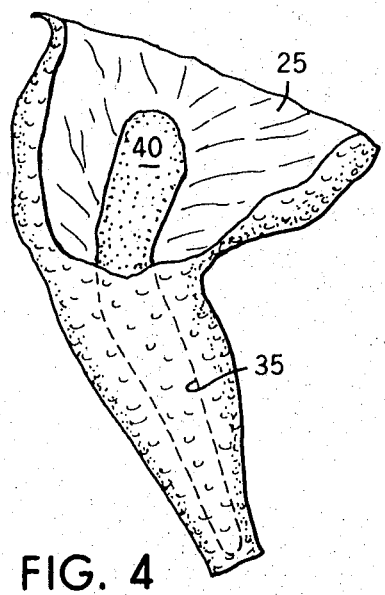
FIG. 4 shows the chicken leg having the stuffing therein and prior to folding over the femur portion.

The removed meat and skin 25 is then inverted so that the skin faces outwardly and a natural pocket 35 is formed in the tibia portion of the meat. The femur portion of the meat may be laid flat as indicated in FIG. 4. A stuffing material 40 is then supplied to the pocket 35 and a small amount of the stuffing is placed on the femur meat portion. This stuffing material may consist of any viscous material desired and may be vegetable, fruit, bread or meat material or a combination thereof such as, for example, spinach or lobster. The opening in the tibia meat portion formed by the removal of the tibia bone therefrom in the nodule area is small enough that the stuffing material can not escape or exude therefrom. The flesh portion serves to form a natural closure such that even during cooking the stuffing material may not escape. The femur meat portion is folded over the stuffing material 40 placed thereon and the meat may then be shaped to assume the natural configuration of a poultry leg. Since only a small portion of stuffing material is placed on the femur meat portion, the folding over serves to retain the stuffing material therein without permitting escape. Since the boning operation for the femur and tibia do not require the necessity of cuts being made along the length of these bones, the flesh has a natural tendency to assume the shape of a leg and no preforming or mechanical arrangement is necessary to have the poultry product assume the shape of a poultry leg. In addition, the boning operation allows the feather tract 45 to remain intact, so that the natural shaping of the poultry product 10 may be easily achieved.

The poultry product may then be frozen and cooked. If desired, the poultry product may be coated with a batter and breading material and frozen or it may be covered with a prepared sauce or gravy such as paprika sauce or mushroom sauce and frozen. The frozen product is then cooked to an internal temperature of 150°–170° F. In addition, the product may be coated with a batter and breading material, sprayed with a predetermined amount of oil, depending on the size of poultry product, cooked and then frozen. The frozen product may then be prepared in an oven by heating to an internal temperature of 150°–170° F. However, it should be understood that this will depend on operator preference and may be cooked in any way desired. Upon cooking, the poultry product retains the stuffing material therein.

From the foregoing, it is now apparent that a novel poultry product and a method of producing same has been described and that various modifications and changes may be made in the product and method without departing from the spirit of the invention, as defined by the claims as follows.

I claim:

1. A method of preparing a stuffed poultry product having a shape resembling a poultry leg from a whole poultry leg which has been removed from a poultry carcass comprising the steps of: pushing the femur bone of the poultry leg through the meat and skin about the femur bone to free the meat and skin therefrom down to the knee joint, making a plurality of cuts around the knee joint to free the meat and skin from the cartilage thereabout, peeling the meat and skin from the tibia bone and over the nodule to remove the meat and skin from the femur and tibia bones whereby the meat and skin are inverted with the meat being present on the outside reinverting the meat and skin from the tibia portion to form a pocket interiorly of the meat, filling the pocket with a stuffing material and folding over the meat and skin from the femur portion to form a stuffed poultry product having a shape resembling a poultry leg and which retains the stuffing material therein upon cooking.

2. The method according to claim 1 wherein the plurality of cuts around the knee cap are made at approximately a 45° angle to the tibia bone and toward the tibia bone.

3. The method according to claim 1 including the steps of applying a sauce material to the stuffed poultry product and freezing the poultry product.

4. The method according to claim 1 including the steps of applying a batter and breading material to the surface of the stuffed poultry product, spraying a cooking oil to the batter and breading coated meat, and freezing the poultry product.